United States Patent [19]

Wilson

[11] Patent Number: 4,841,277
[45] Date of Patent: Jun. 20, 1989

[54] OMNIBUS ALARM SIGNALING SYSTEM
[75] Inventor: John A. Wilson, Scotch Plains, N.J.
[73] Assignee: The Hijack Light, Inc., Newark, N.J.
[21] Appl. No.: 92,677
[22] Filed: Sep. 3, 1987
[51] Int. Cl.[4] ............................................... B60R 25/10
[52] U.S. Cl. .................................... 340/426; 340/434
[58] Field of Search ................... 340/63, 68, 573, 574, 340/84, 87, 103; 307/10 AT

[56] References Cited
U.S. PATENT DOCUMENTS

| | | | |
|---|---|---|---|
| 2,803,810 | 8/1957 | Evans et al. | 340/63 |
| 2,840,795 | 6/1958 | Gee | 340/63 |
| 3,913,066 | 10/1975 | Kehry et al. | 340/63 |
| 4,259,664 | 3/1981 | Boisclair | 340/63 X |
| 4,543,569 | 9/1985 | Karlstrom | 340/63 X |
| 4,550,304 | 10/1985 | Saitta | 340/68 X |

FOREIGN PATENT DOCUMENTS 0022541  2/1985  Japan ................... 340/103

OTHER PUBLICATIONS

*Popular Mechanics*, Mar. 1934, p. 335.

Primary Examiner—Joseph A. Orsino
Assistant Examiner—Brian R. Tumm
Attorney, Agent, or Firm—Charles I. Brodsky

[57] ABSTRACT

An alarm signaling system, in which a pair of warning lights can be activated from inside the omnibus under emergency conditions, but in which hidden control apparatus prevents the deactivation of the warning lights from within the omnibus.

5 Claims, 3 Drawing Sheets

OMNIBUS ALARM SIGNALING SYSTEM

FIELD OF THE INVENTION

The present invention relates to motor vehicles which carry passengers for hire, in general, and to taxi cabs and buses which oftentimes become targets of robbery, hijacking, or other emergency situations, in particular.

BACKGROUND OF THE INVENTION

As is well known and understood, taxi drivers and bus operators are robbed on a daily basis. As is also appreciated, far too many occasions have resulted in the taxi driver, or bus driver, being killed by his or her attacker. It would be desirable, therefore, to make available to the operators of these omnibus motor vehicles some type of alarm apparatus for the purpose of warning others that a robbery, hijacking, or other emergency situation exists. Once others realize the existence of the condition, the Police can be quickly advised, either in person, or by dialing a police emergency call number.

SUMMARY OF THE INVENTION

As will become clear hereinafter, the alarm signaling system of the present invention includes a pair of special warning lights, mounted one at the front and one at the rear of the omnibus vehicle. Preferably of the type to display a flashing red signal, these warning lights are so mounted as to shine on the roadway under the vehicle, and of a type which would not be visible from within the omnibus, so as not to increase the danger to the driver or the occupants within.

Control apparatus is also incorporated within the alarm signaling system, to permit the activation of a switch to energize these lights from inside the taxicab or bus, but which is hidden so as to prevent the deactivation of these lights from within the omnibus. More specifically, and in accordance with a preferred embodiment of the invention, the warning lights can be activated by a foot-controlled switch available to the driver, and in which the control apparatus is located under the hood of the motor vehicle, where a "defeat switch" can be installed. Thus, once activated, the warning lights cannot be turned off unless the hidden, electronic, switch is manually reset. As a result, a large reduction should follow in the number of crimes committed against taxi and bus drivers, who previously were, in effect, prisoners in their own motor vehicles and an easy target with no defenses available.

BRIEF DESCRIPTION OF THE DRAWING

These and other features of the present invention can be more easily understood from a consideration of the following description, taken in connection with the accompanying drawing, in which.

DETAILED DESCRIPTION OF THE DRAWING

Figure 1:
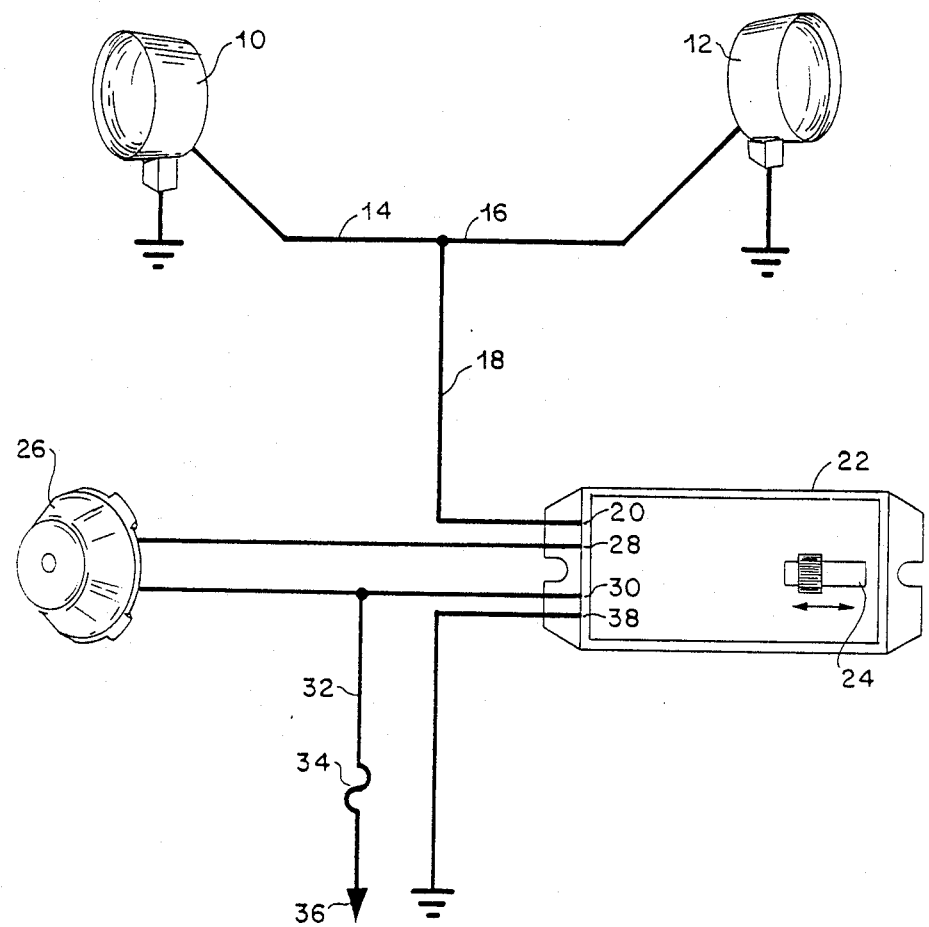
FIG. 1 pictorially illustrates an alarm signaling system in accordance with the teachings of the present invention.

In FIG. 1, reference notations 10 and 12 depict a pair of flashing devices for the purpose of warning the operators of other vehicles (and law enforcement officials) that an emergency situation exists within a taxi or bus. The device 10 is in the form of a flashing red light, to be mounted at the front of the omnibus, while the device 12 is in the form of a flashing red light mounted at the rear of the omnibus -- both mounted so as to shine on the roadway under the vehicle. As indicated by the connections 14, 16 and 18, the flashing lights 10, 12 are coupled to an output terminal 20 of the control apparatus of the invention 22, having a control switch 24, slidable to "arm" the apparatus when moved to the right, and to "disarm" the apparatus when moved to the left. Also shown is an activator switch 26 coupled to the input terminals 28-30 of the control apparatus, and which can be either foot-activated or pushbutton activated by an operator inside the omnibus. The activator control 26 is shown connected by the linkage 32 and a fuse 34 to the vehicle power supply 36 (typically a 12 volt DC battery for a taxicab, or to the appropriate power source for a bus). As will lastly be seen, the control apparatus is referenced to ground, as at terminal 38, as are the two lights 10, 12. As will become clear from the description that follows, sliding the control switch 24 to the "arm" position (to the right) permits the activation of the lights 10, 12 upon the closure of the activator switch 26 -- in order to de-energize the lights 10, 12, the control switch 24 must be moved to the "dis-arm" position (to the left), manually. In accordance with a preferred embodiment of the invention, the control apparatus is hidden on the omnibus, and may be located in the engine compartment of the motor vehicle, for example.

Figure 2:
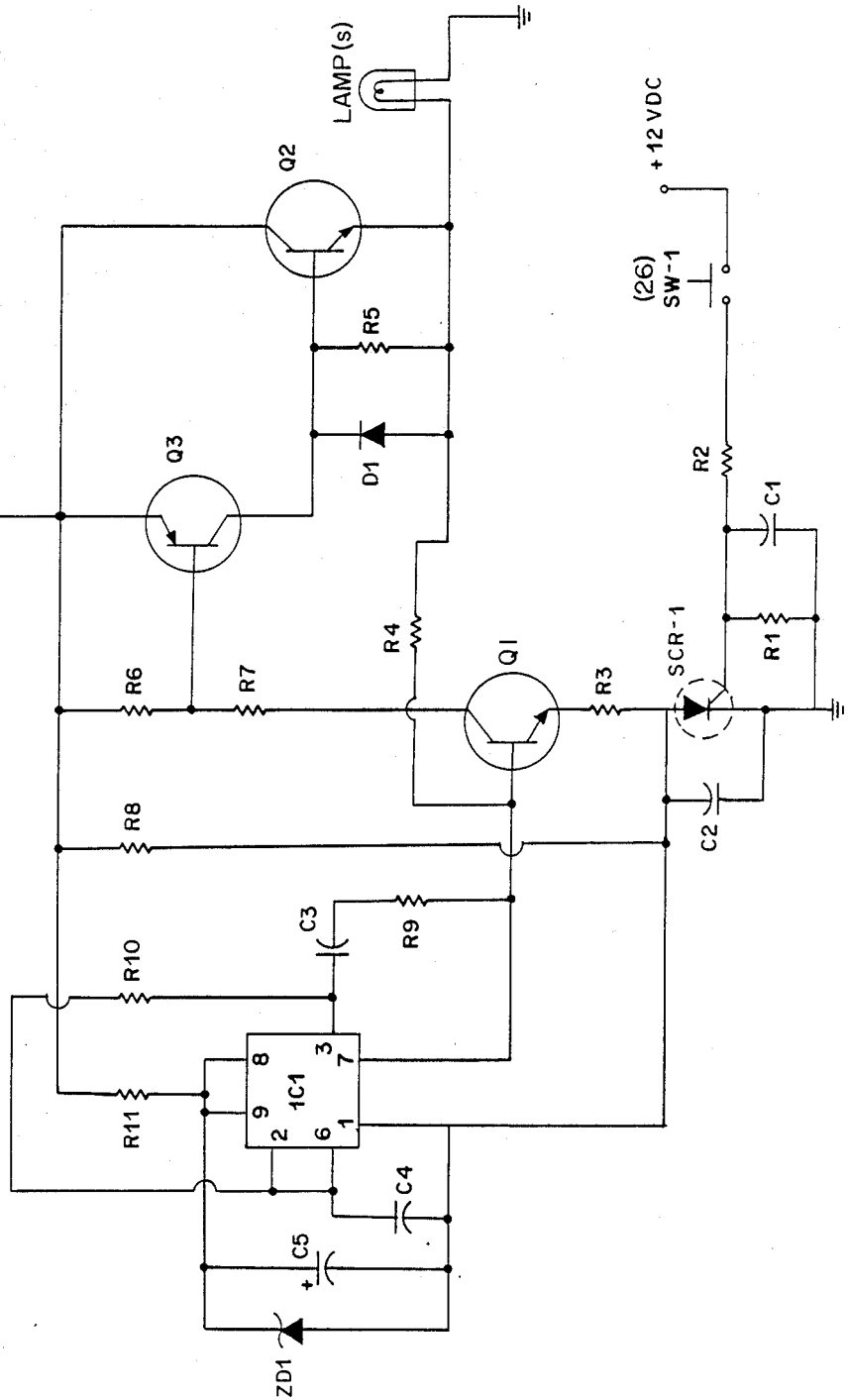
FIG. 2 is an electronic schematic diagram of one form of control apparatus embodying the concepts of the invention.

Referring now to the control apparatus more particularly shown in FIGURE 2, the control switch 24 is indicated by the notation SW-2 which, in its "arm" position as shown, applied a +12 VDC supply source to the electronic circuitry when so employed in the taxi cab prevention use. The warnings lights 10, 12 are schematically illustrated by the notation "LAMP(S)" and the system activator 26 is shown by the notation SW-1, also connected to the +12 VDC power source for taxi cab usage. As indicated, the control circuitry includes three transistors (Q1-Q3), one zener diode (ZD1), one silicon controlled rectifier (SCR-1), two diodes (D1-D2), eleven resistors (R1-R11), five capacitors (C1-C5) and one integrated circuit (IC1), all interconnected as illustrated.

In operation, when power is applied to the circuitry by placing the ARM-DISARM switch SW-2 in the ARM position, no significant current will be caused to flow, and because SCR-1 is not yet turned on. In particular, capacitor C2, across the electrodes of the silicon controlled rectifier, prevents its triggering at this time, so as to prevent any false activation when the circuit is first turned on.

When the activation switch SW-1 is activated, however, current flows through the voltage divider formed by resistors R1 and R2 so as to charge the capacitor C1 causing a current flow into the gate electrode of SCR-1 so as to turn it to its conductive state -- capacitor C1 being used to also prevent any false triggering resulting from transient conditions. At the time that the rectifier SCR-1 fires, current is caused to flow through the reverse polarity protection diode D2 and current limiting resistor R8 so as to insure a sufficient holding current at all times to maintain the device SCR-1 in conduction. When so conductive, the silicon controlled rectifier device anode thus becomes the effective ground potential for the remaining circuitry of the control apparatus.

When SCR-1 fires, furthermore, a current flow developes through diode D2, resistor R11 and zener diode ZD1. Resistor R11 thus limits the current through zener diode ZD1 which responds by developing (for the values illustrated) 6.8VDC across the supply pins 1 and 9 of the integrated circuit IC-1. Capacitor C4 begins to charge at this time through resistor R10, and since capacitor C4 was initially uncharged at the time that power was applied to the integrated circuit IC-1, pin 2 was at its low voltage condition, causing the integrated circuit IC-1 to now trigger. When this trigger occurs, the voltage at the integrated circuit pin 3 goes HIGH, supplying the current through resistor R10, as well as charging the capacitor C3 through resistor R9, through the base-to-emitter junction of transistor Q1, and through resistor R3. This momentary current pulse through transistor Q1 turns it on, which in turn turns on transistor Q3 through the combination of resistor R6 and resistor R7. Current thus begins to flow through transistor Q3, into the base of transistor Q2 to bring it to a conductive condition.

With transistor Q2 conductive, current flows through the alarm light LAMP(S). Assuming the light to be either functional, or open, the voltage developed at the emitter electrode of transistor Q2 will then approach the supply voltage. Such a voltage will be seen to be fed back to the base electrode of transistor Q1 by resistor R4 turning transistor Q1 ON fully, and maintaining the drive to transistor Q3 and, in turn, to transistor Q2. With the values illustrated, when the charge on capacitor C4 reaches approximately 4.5 volts, the integrated circuit IC-1 will reset; at such time, pin 7 of the integrated circuit will sink the current through resistor R4, thereby diverting it from transistor Q1 and allowing such device to turn OFF. This, it will be seen, turns off transistor Q3, which responds by turning off transistor Q2 so as to cease the current to the light LAMP(S). Capacitor C4 then begins to discharge, and when its charge reaches about 2.3 volts, the integrated circuit IC-1 will be noted to trigger again, and the cycle thus repeats. In such manner, the device LAMP continues to glow.

If the LAMP output, on the other hand, should be shorted to ground, the voltage at the emitter electrode of transister Q2 will not rise, as described above, and transistor Q1 will not be biased on beyond the initial pulse. In this case, current will not continue to flow through transistor Q2 into the electrical short, but normal operation will resume once the short is removed.

In accordance with the teachings of the invention, the circuit illustrated will continue to cycle even after activation switch SW-1 is opened. This will be readily apparent from the above description. To reset the circuit, switch SW-2 must be moved to its DISARM position, which interrupts the current flow to the circuit, thus allowing the silicon controlled rectifier SCR-1 to reset. After SCR-1 has reset, placing SW-2 into the ARM position readies the circuit for operation anew, which begins the next time the activation switch SW-1 is momentarily closed (resistors R5 and R6 will be understood in the above description to provide the necessary bias for the base electrodes of transistors Q2 and Q3 respectively, while the diode D1 provides a measure of circuit protection should the light LAMP(S) become shorted to the +12 VDC power supply rather than to ground).

Thus, should an emergency situation develop, the taxi cab driver can warn others of the situation by activating the switch SW-1, and the warning lights thus flash red on the roadway beneath the motor vehicle. By placing the DISARM switch in a hidden location, the warning lights cannot be turned off from within the motor vehicle, and will remain activated until the control switch SW-2 is manually reset.

While applicant does not wish to be limited to any particular set of values, the following have proven to be useful in a preferred embodiment of the invention:

Transistor Q1: MPSA06
Transistor Q2: SJE1349
Transistor Q3: MPS4356
Silicon Controlled Rectifier SCR-1: C2038
Zener Diode ZD1: 6.8 V
Diode D1: IN4004
Resistor R1: 1 KILOHM
Resistor R2: 2.7 KILOHM
Resistor R3: 47 OHMS
Resistor R4: 1.5 KILOHMS
Resistor R5: 180 OHMS
Resistor R6: 1 KILOHM
Resistor R7: 470 OHMS
Resistor R8: 1 KILOHM
Resistor R9: 1 KILOHM
Resistor R10: 4.3 MEGOHMS
Resistor R11: 1 KILOHM
Capacitor C1: 0.1 MICROFARADS
Capacitor C2: 0.1 MICROFARADS
Capacitor C3: 0.1 MICROFARADS
Capacitor C4: 0.1 MICROFARADS
Capacitor C5: 10 MICROFARADS
Integrated Circuit IC-1: 555

Figure 3A:
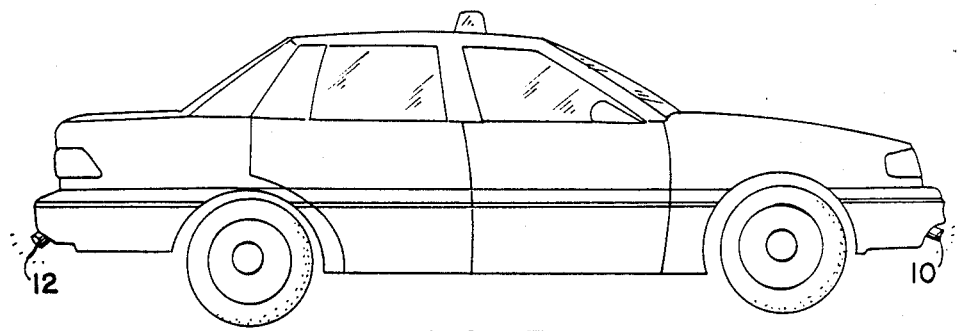
FIGS. 3a-c illustrate portions of an omnibus vehicle helpful in an understanding of the invention.
Figure 3B:
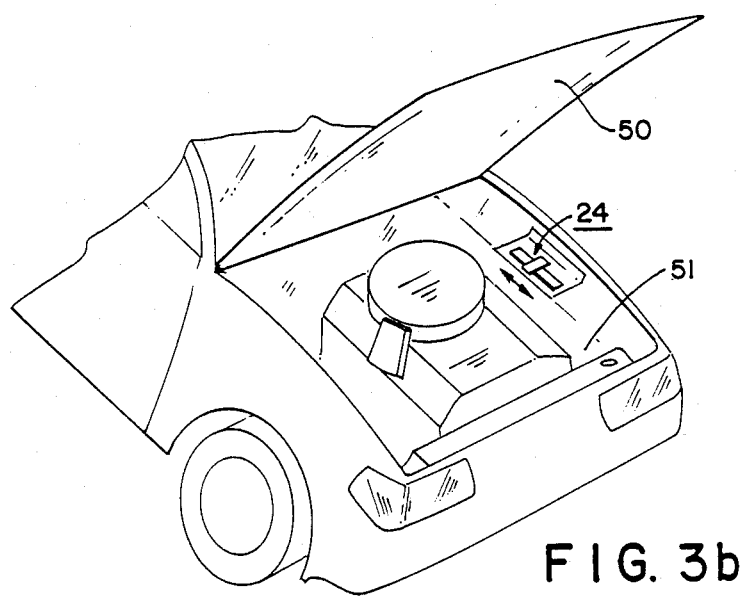
Figure 3C:
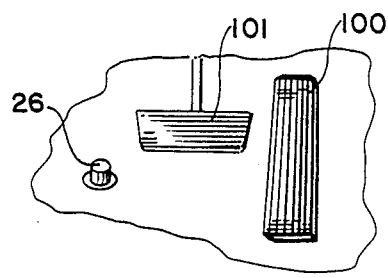

Referring to FIGS. 3a–3c, the omnibus vehicle illustrated is in the nature of a "taxicab", with the flashing lights 10, 12, being located adjacent the front and rear bumpers, and angled to illuminate the roadway under the vehicle. With the hood 50 raised, for example, the slidable switch 24 mounted in the compartment 51 thus becomes accessible. The activator switch 26 will be seen, in this illustration, to be footactivated, located adjacent to the acceleration pedal 100 and the brake pedal 101.

While there has been described what is considered to be a preferred embodiment of the present invention, it will be readily understood that modifications can be made by those skilled in the art without departing from the scope of the teachings herein. Thus, although the present invention has been described in the context of mounting a pair of warning lights so as to shine on the roadway under the vehicle, it will be readily apparent that the display lights can be mounted in manner similar to the sealed-beam headlights on the motor vehicle, or at any other location just so as they will not be observed from inside the motor vehicle, and heighten the degree of danger to the driver or others therein. Similarly, while the schematic illustration of FIG. 2 is particularly useful for motor vehicles of 12 volt direct current power, the operation can follow equally anew for power systems of other magnitude -- just by appropriate changes in the component values indicated. For at least such reasons, therefore, resort should be had to the claims appended hereto for a correct understanding of the scope of the invention.

I claim:

1. An alarm signaling system for taxi cabs, buses and similar such motor vehicles carrying passengers for hire, comprising:

illumination means mounted on said motor vehicle and capable of providing a visual alert to persons located outside said vehicle;

first switch means available to an operator within said motor vehicle to activate said illumination means from within said vehicle; and second switch means available to deactivate said illumination means, but only available to deactivate said illumination means from without said motor vehicle;

wherein said first and said second means are incorporated as part of an included control apparatus which also provides a cycling timing signal to periodically energize said illumination means once said first switch means is activated; and wherein said illumination means is mounted on said motor vehicle to provide a visual alert illuminating the roadway under said vehicle once energized by said first switch means.

2. The alarm signaling system of claim 1 wherein said illumination means includes a first lamp mounted towards a front end of said motor vehicle and also includes a second lamp mounted towards a rear end of said vehicle.

3. The alarm signaling system of claim 1 wherein said control apparatus continues to provide said cycling timing signal to periodically energize said illumination means even after said first switch means is deactivated.

4. The alarm signaling system of claim 1 wherein said second switch means is located within an engine compartment of said motor vehicle.

5. The alarm signaling system of claim 4 wherein said first switch means is located within said motor vehicle so as to be foot-activated by an operator thereof.

* * * * *